July 18, 1961 C. C. RAYBURN ET AL 2,992,730
CONDENSER TESTER

Filed Nov. 15, 1955 5 Sheets-Sheet 2

INVENTORS
Charles C. Rayburn
John R. Thorson
BY
Donald P. Smith
Attorney

INVENTORS
Charles C. Rayburn
John R. Thorson
BY
Donald P. Smith
Attorney

United States Patent Office 2,992,730
Patented July 18, 1961

2,992,730
CONDENSER TESTER

Charles C. Rayburn, Falls Church, and John R. Thorson, Alexandria, Va., assignors, by mesne assignments, to Illinois Tool Works, Chicago, Ill., a corporation of Illinois Filed Nov. 15, 1955, Ser. No. 546,964
19 Claims. (Cl. 209—81)

Our invention relates to a machine for automatic testing of a series of similar condensers which rejects those having less than a predetermined capacitive reactance and/or less than a predetermined internal resistance or dielectric strength.

The object of this invention is to automatically test wound condensers having no lead wires for dielectric strength as well as for capacitance in a quantitive sense.

Another object of this invention is to provide an apparatus in which a stacked supply of condensers or similar devices will be automatically fed in sequence to a test position, and automatically discharged from the test position in accordance with the test findings.

Another object of the invention is to provide a step-by-step feeding mechanism for controlling the movement of a plurality of cylindrical condensers arranged in a stack at the end of a chute, the feeding mechanism automatically supplying a single condenser to a test station after each testing operation.

Broadly the invention comprehends the provision of a series of untested condensers stacked end on end in an inclined chute leading into the machine. These condensers have external terminals on the outermost extremities of a housing case. On the chute a series of four gates cooperate in a repetitive sequence to, one by one, release a condenser from the stack, put it into test position, and finally to release it to one of two collection bins. This sequence is controlled by switches actuated by continuously moving cams. While in the test position electrical contact is made with the condenser terminals by two gates. A high voltage, high impedance source of direct current potential is applied to the condenser through the contacting gates. If the condenser is acceptable, this voltage will cause two series-connected relay switches to close and thus instrument its acceptance. One switch is closed by the appearance of an appropriate direct current potential on a relay tube grid as a result of a sufficient charging current passing through the condenser. The other switch is closed if the internal resistance, or dielectric strength is sufficient to maintain a predetermined direct current potential at the high voltage terminal. Here a leaky condenser will cause the voltage to drop because of an inherently high internal resistance of the high voltage source. If the condenser is such that both solenoid actuated switches close, a rejection trap is closed and the condenser, upon release from the test site, slides into a bin provided for acceptable condensers. If the condenser fails either or both tests, one or both switches will remain open with the result that the rejection trap will remain open and in leaving the test site the condenser will fall into a bin provided for rejected condensers.

Other objects of our invention will become apparent from the accompanying specification, appended claims and drawings, in which:

FIGURE 8 is a schematic diagram of the cam operated switch and relay circuits for sequential operation of the positioning gates;

Figures 2, 7:
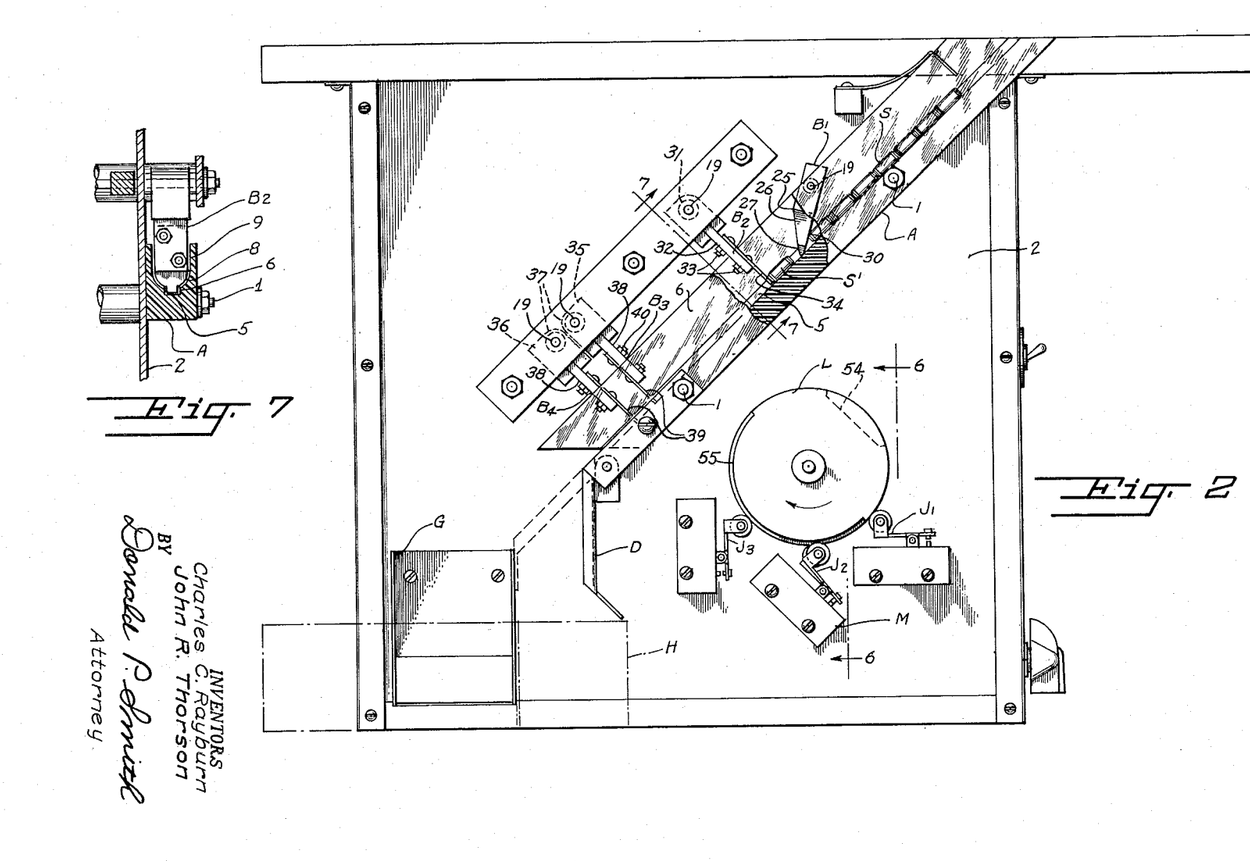
FIGURE 2 is a side view of the machine showing the cam actuated switches and the arrangement of positioning gates with respect to the chute and hoppers.
FIGURE 7 is a section view on line 7—7 of FIGURE 2 showing the profile of the chute and the profile of the gate.

The basic element of the mechanical assembly is chute A which is formed of a suitable non-conductive plastic, such as polystyrene, and is generally U-shaped in cross section as best shown in FIGURE 7. The base of the chute is relatively thick to provide for the passage of the fastening means in the form of bolts 1 which extend through transverse holes therein and through the vertical supporting wall 2 forming a part of a frame structure. The inner face of the base of the chute is formed medially with a central, generally rectangular trackway defined by bottom wall 5 and vertical walls 6, the walls 6 being spaced to snugly receive the condensers as they slide therealong to maintain the end contacts of the condensers in proper alignment to engage the contacts of the testing means as will more clearly appear. The chute walls above the condenser receiving trackway defined by the walls 5 and 6 are generally arcuate as at 8 and these walls merge into the flat spaced parallel areas 9. The chute thus constructed is shown in FIGURE 2 secured by the bolts 1 at substantially 45 degrees to the vertical wall 2 forming a part of a housing containing the operating mechanism, it being desirable to have the test chute and directly associated parts open for inspection.

Figure 1:
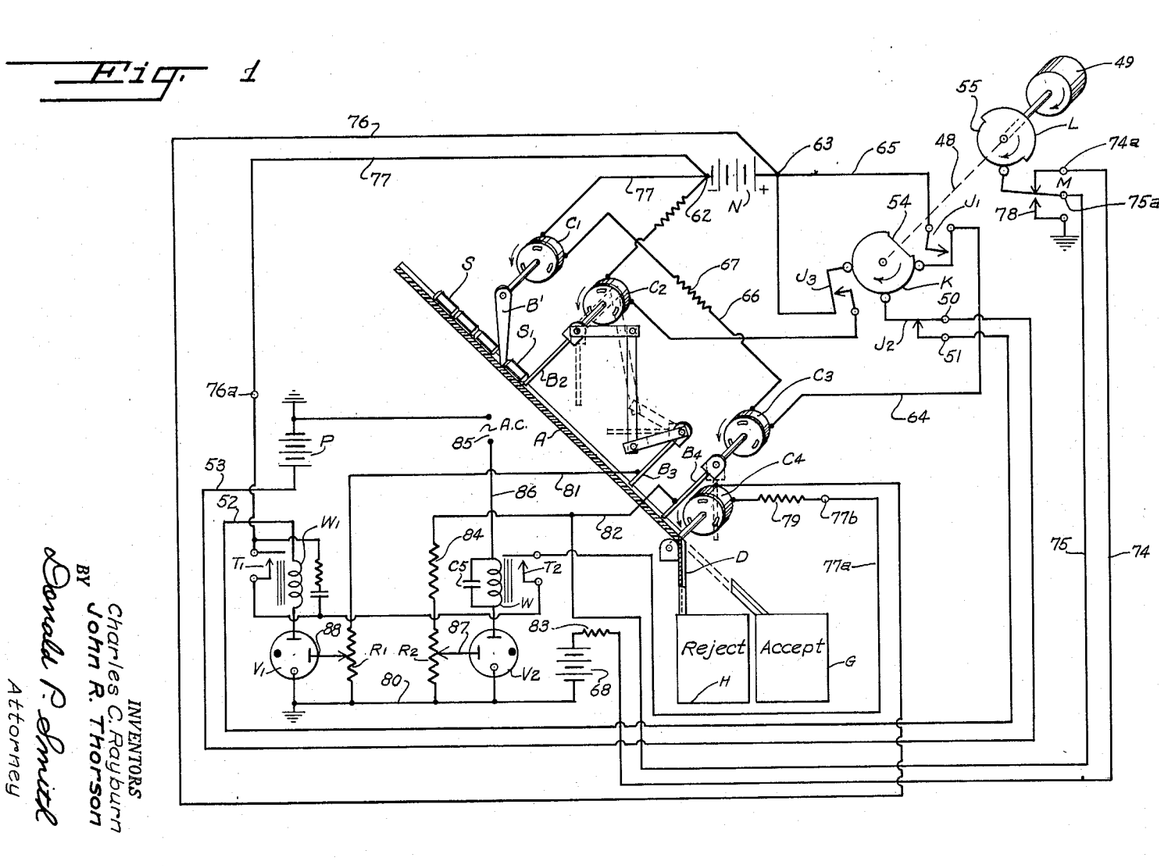
FIGURE 1 is a schematic diagram of the machine and the control and testing circuits.

Positioned immediately above the chute A is the feeding and testing mechanism which operates therein. The condensers are stacked in the upper part of the chute A and are fed from the upper part of the chute one by one through a plurality of escapement gates, the escapement gates functioning to separate a single condenser from the bottom of the column of condensers in the chute, and feed such single condenser to coacting escapement fingers which also function as contacts which connect with the test circuits. There are four of these escapement gates as shown in FIGURES 1 and 2 indicated by reference characters $B_1$, $B_2$, $B_3$, and $B_4$, and these gates include operating means in the form of rotary solenoids. Gates $B_1$ and $B_4$ are operated simultaneously by separate solenoids $C_1$ and $C_3$, while the intermediate gates $B_2$ and $B_3$ are mechanically linked together for simultaneous operation by a single rotary solenoid $C_2$. Following the discharge of the condenser from escapement gates $B_3$ and $B_4$ the condensers are discharged by a hinged discharge chute D operated by rotary solenoid $C_4$.

Figures 9, 10:
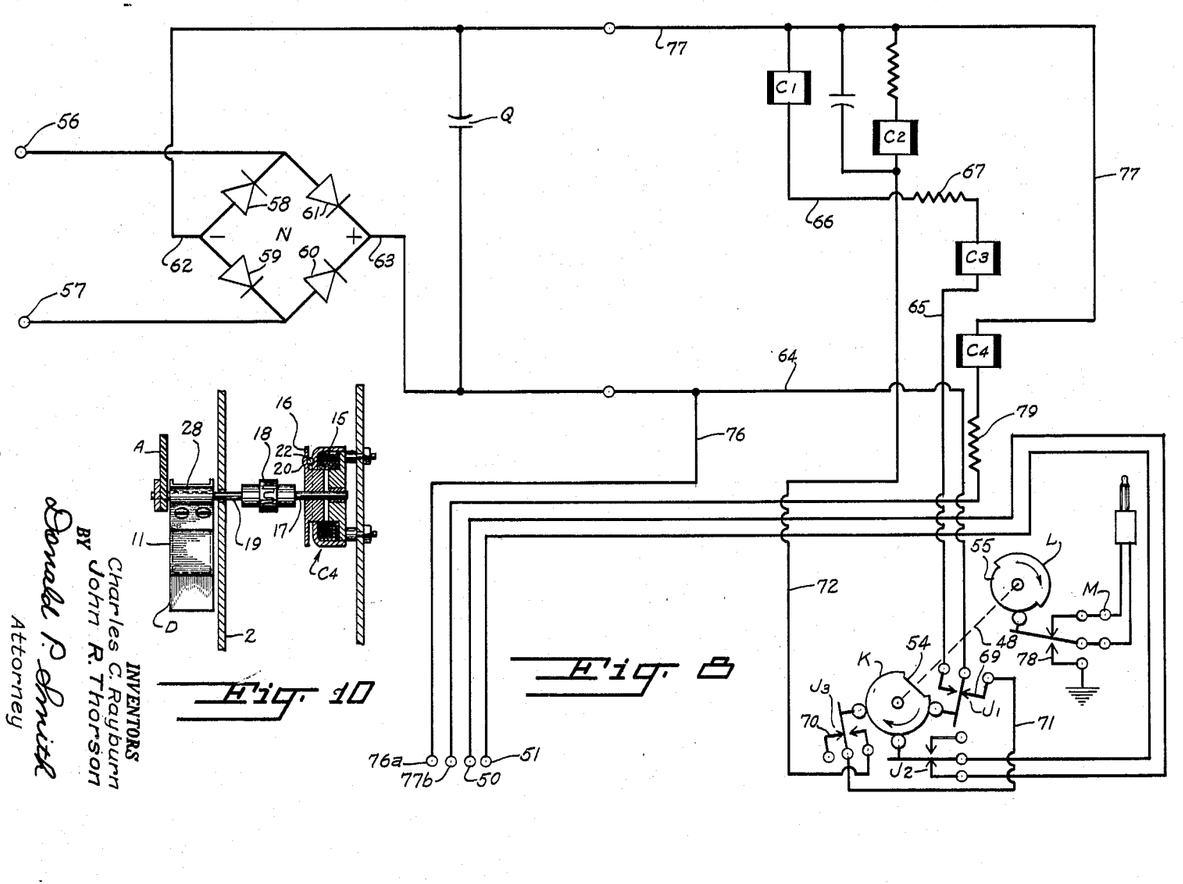
FIGURE 9 is a schematic diagram of the circuit for testing the condensers and operating the rejection gate.
FIGURE 10 is an elevation, partly in section, showing the solenoid structure operating the gates.
Figure 9:
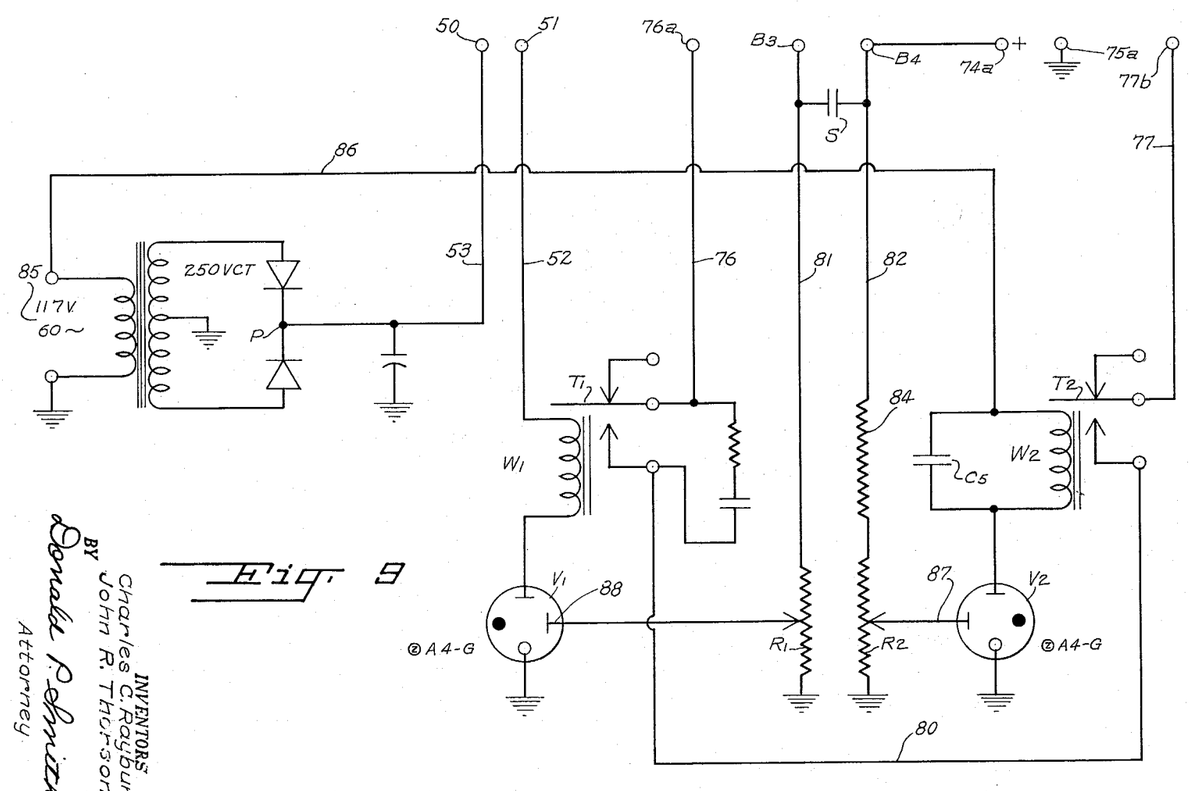

The structure of the rotary solenoids operating the gates and discharge chute and the connecting structure between the rotary solenoids and the gate or chute is identical in each instance and for this reason a single description of one of the operating mechanisms is believed sufficient to provide a complete disclosure. The rotary solenoid and the drive connection between the solenoid and its associated part, i.e. the gate or the hinged chute, is shown in FIGURE 10. This disclosure in FIGURE 10 is a cross section illustrating solenoid $C_4$ and its associated chute D. From this figure it will be seen that the assembly includes the electromagnet 15 of ring form which acts to urge the armature 16 inwardly with its associated medial shaft 17. This shaft 17 is connected by toothed clutch 18 to shaft 19 carrying the swinging chute D. The toothed clutch 18 permits the shaft 17 to shift axially upon operation of the armature and still transmit rotary motion to shaft 19 carrying the swinging chute. In the type of rotary solenoid used, as is well known in the art, the shaft section 17 connected to the armature 16 rotates simultaneously with its axial motion, this resulting from the use of the inclined planes 20 along which the balls 22 travel, these balls being arranged between the solenoid and the armature and in registering cavities formed in these parts and defining the inclined plane structures. Usually these armatures are supported by three of these ball bearings and they travel around and down three inclined ball races or grooves, the armature thus being forced to rotate by a cam action. The rotation of the armature and its shaft continues until the balls have traveled to the deep end of their respective races and provides almost frictionless conversion from straight pull to rotary motion. Inasmuch as any solenoid develops a rapidly increasing amount of magnet pull as the air gap closes, it is necessary to compensate for this condition by the provision of the compound angle of incline of the ball race. In other words at the beginning of the stroke the incline is steep and gradually decreases as the ball approaches the end of the race, thus increasing the torque at the start of the stroke where it is most needed.

Referring again to FIGURE 2, the first escapement gate $B_1$ includes an elongated body 25 with a tapered extremity 26, the end 27 of which is of a width to be received between the walls 5 and 6 of the condenser groove in the chute. The body 25 is formed with a transverse opening 28 through which a shaft section 19 extends and is fixed thereto, this shaft section being connected with the rotary solenoid $C_1$ through the means heretofore described and illustrated in FIGURE 10 including the toothed clutch 18. The tapered extremity 26 of the gate $B_1$ is of a diameter to provide sufficient clearance between the adjacent walls of the chute A to permit the operation of the gate and the angle at which the gate lies is such that the bottom face of the gate $B_1$ engages the top of the condenser at 30. This arrangement applies a transverse pressure to this adjacent condenser and captivates the column of condensers lying in the chute A. The second gate $B_2$ includes a hub portion 31 mounted on its shaft section 19 for drive from the motor $C_2$. Clamped between two portions of the hub is the depending gate 32 to which is bolted by bolts 33 the metallic finger 34. The gate 32 is of non-conductive material. Gates $B_3$ and $B_4$ are located on their shafts 19 at the lower end of the carrying structure and are positioned relatively close to each other. The hubs of the gates $B_3$ and $B_4$ are located at 35 and 36, respectively, and these hubs are cut away at 37 to provide clearance to permit relative movement of the hubs during turning under operating conditions of the parts. Each of these hubs includes a gate section 38 of non-conductive material and the metallic extension 39, the latter being bolted to the non-conductive gate portion by bolts 40 which also provide connecting means for wires connecting the metallic contacts with the testing circuits, as will be more fully hereinafter described. These gates $B_3$ and $B_4$ are positioned so that when in their parallel position they are spaced to receive therebetween a condenser and to contact the terminals of the condenser with the metallic tips 39 of the gates.

Figures 4, 5, 6:
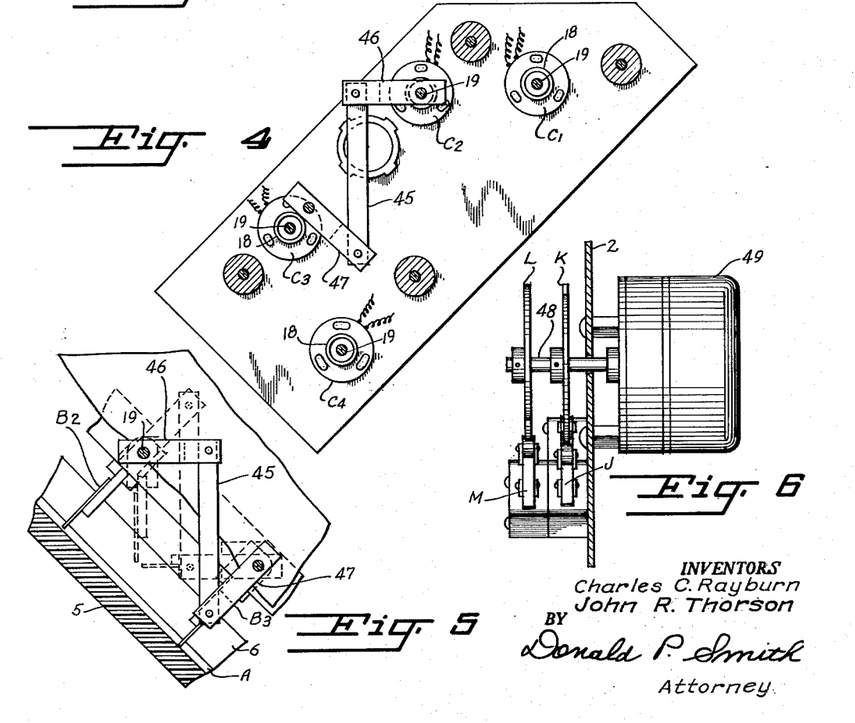
FIGURE 4 is a view along line 4—4 of FIGURE 3 showing in elevation the position of the gate actuating solenoids.
FIGURE 5 is a view along section line 5—5 of FIGURE 3 showing alternate positions of the mechanical linkage connecting two of the gates.
FIGURE 6 is a view along line 6—6 of FIGURE 2 showing a side view of the cam actuated switches, the cams and the driving motor.

By reference to FIGURES 4 and 5 it will be seen that gates $B_2$ and $B_3$ are linked together by link 45 which connects the angular arm 46 of gate $B_2$ with the extremity of the arm 47 of gate $B_3$. This linkage permits the operation of both gates $B_2$ and $B_3$ by a single motor. The gates $B_2$ and $B_3$ through this linkage operate simultaneously, one in clockwise and the other in a counterclockwise direction from a single source of power from motor $C_2$. The fourth gate $B_4$ is individually controlled by its motor $C_3$.

As previously stated the condensers to be tested, which are indicated by reference character S, are stacked end to end in the non-conductive plastic chute A. The stack of condensers is initially arrested in the chute A by gate $B_2$ as shown in FIGURES 1 and 2. Actuation of gate $B_1$ holds back all of the stack arrested by gate $B_2$ except for one condenser S, outside its reach. Gates $B_2$ and $B_3$ are mechanically interconnected so that as $B_2$ swings clockwise 45 degrees (FIGURES 4 and 5) $B_3$ swings counterclockwise, thereby permitting one condenser S to slide down the chute until arrested by gate $B_4$. The mechanically linked gates $B_2$ and $B_3$ then return to the position shown in FIGURES 1 and 2. Gate $B_3$, like gate $B_4$, is provided with an electrically conductive gating finger 39 with external electrical connection 81 so that in closing, electrical contact is made with the ends of the condenser S which has moved to its test position. If the condenser in test position between gates $B_3$ and $B_4$ passes an acceptance test, chute D rotates into contact with acceptance hopper G, providing a continuous path from the track A to the bin G provided for acceptable condensers. If it fails, rejection gate D remains stationary which will allow the condenser to fall into the bin H provided for rejected condensers. In a final step then, gate $B_4$ swings clockwise allowing the condenser to gravitate to the appropriate bin G or H. Simultaneously with the rotation of gate $B_4$, gate $B_1$ rotates clockwise to allow translation of the condenser stack to gate $B_2$, and the beginning of a new test cycle. The cooperating cycle of gates $B_1$ and $B_2$ constitutes a motion directly analogous to that of an escapement mechanism.

Figure 3:
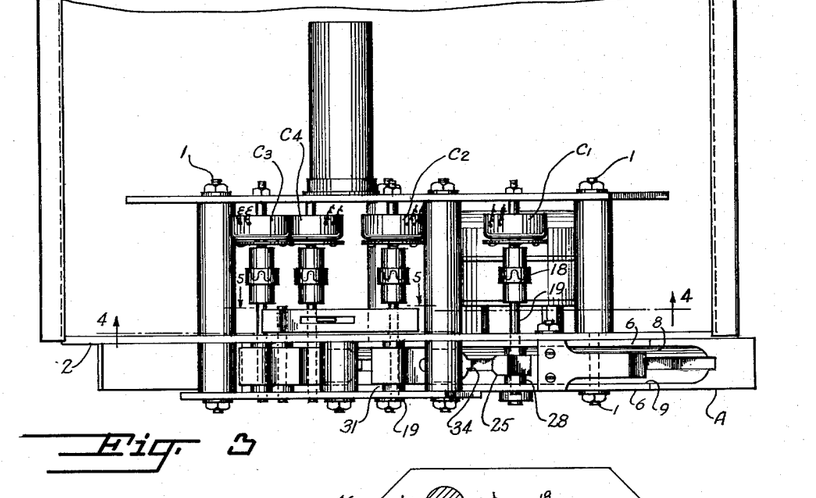
FIGURE 3 is a top view of the machine showing in plan the position of the gate actuating rotary solenoids.

Four rotary type solenoids $C_1$, $C_2$, $C_3$, and $C_4$ are provided, three to actuate the condenser handling gates $B_1$, $B_2$, $B_3$ and $B_4$ in a repetitive continuous sequence and the fourth $C_4$ to actuate the chute D once for each cycle in which a condenser passes both the test for capacity and that for dielectric strength. The relative positioning of the solenoids can be seen from FIGURES 3 and 4. The necessity of only four solenoids to actuate five gates results from the use of the mechanical linkage described and which permits solenoid $C_2$ to actuate both gates $B_2$ and $B_3$ (FIGURES 4 and 5). As noted earlier in describing the sequence of operation, gate $B_2$ swings clockwise concurrently as gate $B_3$ swings counterclockwise (FIGURE 2) allowing a condenser separated from the stack by gate $B_1$ to slide into test position. Alternate extreme-positions of gates $B_2$ and $B_3$ is shown in FIGURE 5 wherein the solid lines depict the normally closed position and the dotted lines depict the open position assumed when solenoid $C_2$ is actuated.

The sequence of operation of the various solenoids and gates is controlled by switches $J_1$, $J_2$ and $J_3$ operated by cam K. The application of the high voltage testing potential is controlled by switch M, operated by cam L. The switch-actuating cams K and L are driven in unison on a common shaft 48 by electric motor 49 which can be best viewed from FIGURE 6.

The schematic diagram of FIGURES 1 and 8 illustrate the relative orientation of cams K and L with respect to the actuating switches $J_1$, $J_2$, $J_3$ and M as well as circuit connections for the direct current power supply N and solenoids $C_1$, $C_2$, $C_3$ and $C_4$. In the position shown in FIGURE 1 or FIGURE 8, switch $J_2$ is closed connecting terminals 50 and 51 together; this applies direct current power from power supply P through connecting wires 52 and 53 to one relay tube $V_1$ in the test circuit (to be described later). Switches $J_1$ and $J_3$ are initially open.

Cam K is circularly concentric with driving shaft 48 except for a recessed portion 54 comprising about 60 degrees of arc along its periphery designed to actuate switches $J_1$, $J_2$ and $J_3$. Cam L also mounted on shaft 48 and driven by motor 49 has a functionally similar recess 55 but extending a full 180 degrees around its periphery. Instead of the battery supply N shown for simplicity in the schematic (FIGURE 1), in practice direct current power for the four solenoids is provided by the full wave rectifier bridge N (FIGURE 8), having alternating current input terminals 56 and 57, four diode elements 58, 59, 60 and 61, and output terminals 62 and 63. Capacitor Q serves to filter the rectified alternating current in conjunction with the solenoids $C_1$, $C_2$, $C_3$ and $C_4$ which as the load inherently constitute a series inductive-reactance. The solenoids are connected across the terminals of the power supply N through switches $J_1$ and $J_3$.

Following the sequence of a complete cycle resulting from clockwise rotation of 360 degrees of the cams K and L from the position shown in FIGURE 1 or FIGURE 8, switch $J_1$ is first released, closing the circuit across the power supply N through solenoids $C_1$ and $C_3$ by way of connecting wires 64, 65, 66 and 77. Resistor 67 is interposed in series with solenoids $C_1$ and $C_3$ to limit the current flow to that required for operation. Solenoid $C_1$ actuates the escapement gate $B_1$ which allows the supply of condensers to slip down to gate $B_2$ on chute A (FIGURES 1 and 2); solenoid $C_3$ opens gate $B_4$ thereby releasing a tested condenser from the test site between gates $B_3$ and $B_4$. In a second movement, switch $J_1$ is restored, removing the power from solenoids $C_1$ and $C_3$ and restoring gates $B_1$ and $B_4$ to their closed position, with a new condenser S separated and ready for admission to the test site. In a third step, switch $J_2$ is actuated, thereby opening the circuit between external terminals 50 and 51 and closing it again; this step prepares a testing circuit to be described later. The next switch to be actuated is $J_3$, which closing thereupon actuates solenoid $C_2$ by application of voltage from power supply N through the extra terminals 69 of switch $J_1$ and connecting wires 71 and 72. Solenoid $C_2$ actuates the mechanically coupled gates $B_2$ and $B_3$, allowing the readied condenser S to slide down trough A into the test position where it is arrested by gate $B_4$, now closed. Upon opening of switch $J_3$ by further rotation of cam K, solenoid $C_2$ is deenergized gates $B_2$ and $B_3$ are restored to the positions shown in FIGURE 1 and a test voltage from supply 68 is applied to the condenser through gates $B_3$ and $B_4$ by the closing of switch M, operated by cam L which is on the shaft driving cam K (see FIGURE 6). If the condenser passes the tests, contact is established externally between terminals $76^a$ and $77^b$, thus actuating solenoid $C_4$ through application of direct current power from supply N and wires 76 and 77; this moves accept gate D into the position shown in dotted line in FIGURE 1 thus providing a path to the accept bin G. In a final step before release of the tested condenser S, switch M is depressed by cam L, thereby removing the test voltage 68 from the condenser and shorting out the electrostatic charge stored therein by the closing of contacts 78 to ground in switch M, thereby grounding the terminal of the tested condenser S in contact with gate $B_4$. With actuation of switch $J_1$ the tested condenser is released from the test site by the motion of gate $B_4$ and the test cycle starts anew.

The condenser testing circuit to which terminals 50, 51, $76^a$ and $77^b$ and terminals $74^a$ and $75^a$ from the cycling circuit of FIGURE 9 are connected is shown in FIGURE 8 more detailed than in FIGURE 1.

The essential ideas of the test circuit were outlined in the introduction to this specification. The following description is provided to show the exact manner in which a selection is made of only those condensers having greater than a minimum allowable dielectric strength and electrostatic capacity. It was stated in the description of the cycling circuit that after a test voltage is applied to the condenser S through contact with the conductive fingers 39 of gates $B_3$ and $B_4$, the properties of an acceptable condenser S are sensed by the test circuit in a way which causes a connection to be completed between terminals $76^a$ and $77^b$. In FIGURE 9 it is seen that closure of this circuit requires actuation of two relay switches $T_1$ and $T_2$ which are series connected across terminals $76^a$ and $77^b$ via connecting wires 76, 80 and 77. Relay switches $T_1$ and $T_2$ are each actuated by the discharge of cold cathode relay tubes $V_1$ and $V_2$, respectively. Here connection of the test condenser S between probe gates $B_3$ and $B_4$ is depicted by condenser S in FIGURE 9. When the positive high voltage supply 68 (FIGURE 1) is connected via wire 74, switch M, wire 75, resistor 83, wire 82, and probe gate $B_4$ to the test condenser S, a positive potential will appear on the grid 87 of relay tube $V_2$ through potential divider $R_2$ and the connecting wire 82 and resistor 84 provided that condenser S has a high internal resistance. In this case tube $V_2$ will fire, half-wave alternating current will flow through tube $V_2$ from the alternating current supply 85 through wire 86 and relay $W_2$ with the result that switch $T_2$ will close. The high voltage supply, having high output impedance, depicted by resistor 83 in series with direct current source 68 (FIGURE 1), will not maintain sufficient voltage at the grids 87 to fire tube $V_2$ should the condenser S have a low internal resistance. In this case switch $T_2$ would remain open and connection between terminals $76^a$ and $77b$, the sign of an acceptable condenser, would be precluded.

The second requirement, that of sufficient capacity, is sensed by relay tube $V_1$ whereby its discharge is initiated by a positive transient potential occurring on the grid 88. Thus when the test voltage 68 is applied to test gate $B_4$ the charging current flowing through condenser S passes through wire 81 and voltage divider $R_1$ causing a positive voltage transient to appear at the grid 88 of tube $V_1$. If the capacity of condenser S is greater than a minimum value, sufficient positive voltage will appear on grid 88 to cause tube $V_1$ to fire, thus initiating conduction from the direct current power supply P through link 53, switch $J_2$, link 52, and through relay coil $W_1$, thus closing switch $T_1$. If both $T_1$ and $T_2$ are closed, the required connection between terminals $76^a$ and $77^b$ is completed and solenoid $C_4$ (FIGURES 1 and 8) will actuate the accept gate D. However, if either test fails, this circuit will remain open and the accept gate D will not close and condensers leaving the test site will fall into the reject bin H.

It will be noted that with the use of a direct current supply P, tube $V_1$ remains conducting even though the grid receives only a transient voltage. Conduction is terminated when the supply P is removed by opening of switch $J_2$ in the operating cycle of cam M. Switch $T_2$ is held closed from the time when the high voltage is removed until the condenser passes over the accept gate D by the discharge of condenser $C_5$ which also acts to reduce "chatter" in switch $T_2$. The sensitivity of relay tubes $V_1$ and $V_2$ is readily adjusted by adjustment of the take off points on potential dividers $R_1$ and $R_2$, respectively.

It will be noted that this machine is arranged so that in the event some component part becomes defective, the result will be a rejection of all condensers, good and bad, so that no bad condensers will appear to pass the test.

What we claim is:

1. An apparatus for testing condensers comprising an inclined chute down which said condensers will travel by gravity, a plurality of pairs of gates movable into said chute in the path of movement of said condensers, a first pair of gates mounted at an upper position of said chute, means for alternately operating said first pair of gates to hold a series of said condensers in end-to-end relation at said upper portion of said chute and to free the lowermost condenser for passage to a lower position of said chute, a second pair of said gates mounted at said lower position, means for operating said second pair of gates alternately, a contact at one extremity of each one of said second pair of gates for engaging the terminals of a condenser therebetween, a testing means for said condensers connected to said contacts on said second pair of gates, a movable trough at the lower end of said chute, means for operating said trough for directing said condensers into predetermined paths after testing, control means for said trough operating means and responsive to said testing means, and means interconnecting one gate of said first pair of gates and one gate of said second pair of gates for simultaneous movement thereof.

2. An apparatus for testing condensers comprising an inclined chute down which said condensers will travel by gravity, a plurality of pairs of gates movable into said chute in the path of movement of said condensers, a first pair of said gates mounted at an upper position of said chute to hold a series of said condensers in end-to-end relation at said upper portion of said chute and to free the lowermost condenser for passage to a lower position of said chute, a second pair of said gates mounted at said lower position, a contact at one extremity of each one of said second pair of gates for engaging the terminals of a condenser therebetween, a testing means for said condensers connected to said contacts on said second pair of gates, a movable trough at the lower end of said chute, means for operating said trough for directing said condensers into predetermined paths after testing, control means for said trough operating means and responsive to said testing means, a single electric power means operatively interconnecting one gate of said first pair of gates and one gate of said second pair of gates for simultaneous movement thereof, and different power means operatively connected to the other gates of said first and second pair of gates to operate said other gates alternately to said one pair of gates of said first and second pairs of gates.

3. An apparatus for testing condensers comprising an inclined chute down which said condensers will travel by gravity, a plurality of gates arranged in pairs and movable into said chute in the path of movement of said condensers, a first pair of gates at an upper position of said chute, means for alternately operating said first pair of gates to hold a series of said condensers in end-to-end relation at said upper portion of said chute and to free the lowermost condenser for passage to a lower position of said chute, a second pair of gates at said lower position, means for operating said second pair of gates alternately, a contact at one extremity of each one of said second pair of gates for engaging the terminals of said condenser therebetween, a testing means for said condensers connected to said contacts on said second pair of gates, a movable trough at the lower end of said chute, means for operating said trough for directing said condensers into predetermined paths after testing, control means for said trough operating means and responsive to said testing means, a first power means operatively connected to one gate of said first pair of gates and one gate of said second pair of gates for simultaneous operation thereof, different power means operatively connected to the other gates of said first and second pair of gates, said first and different power means including control switches, and means for continuously operating said control switches in sequence.

4. An apparatus for testing condensers having end terminals, said apparatus comprising an inclined chute down which said condensers will travel by gravity, a first gate means in an upper portion of said chute for holding a column of said condensers, a second gate means positioned in said chute above said first gate means for engaging and retaining said column of condensers with the exception of the lowermost condenser abutting said first gate means, means for operating said first and second gate means alternately to release said lowermost condenser to travel down said chute, a third gate positioned in said chute below said first gate, means to open said third gate simultaneously with said first gate, a fourth gate positioned in said chute below said third gate to stop a condenser passing said third gate, said third and fourth gates including contacts for engaging said end terminals of said condenser to form a testing station, a condenser testing means connected to said contacts, and means responsive to said testing means for opening said fourth gate and for controlling the disposal of said condenser after it leaves the test station.

5. A condenser testing apparatus for testing condensers having spaced terminals, said apparatus comprising an inclined chute down which said condensers will travel by gravity, a first gate in an upper portion of said chute for holding a column of condensers, a second gate positioned in said chute above said first gate for engaging and retaining said column of condensers with the exception of the lowermost condenser abutting said first gate, means for operating said first and second gates alternately to release only said lowermost condenser to travel down said chute while said second mentioned gate retains the balance of said condensers in said chute, a third gate positioned in said chute below said first gate, means connecting said third gate to said first gate for simultaneous operation therewith, a fourth gate positioned in said chute below said third gate, means to operate said fourth gate, said third and fourth gates being spaced when in their closed positions a distance permitting their engagement with the terminals of a condenser positioned therebetween, said third and fourth gates each including a contact for contacting a different one of said terminals of said condenser positioned between said third and fourth gates, a condenser testing means connected to said contacts, and means responsive to the operation of said testing means for controlling the disposal of the condenser on operation of said fourth gate.

6. An apparatus for testing condensers comprising an inclined chute down which the condensers will travel by gravity, means for testing a condenser positioned intermediate the ends of said chute, said means including upper and lower spaced gates alternately movable into and out of the chute, means for moving said upper gate to open position to permit one of said condensers to move by gravity down said chute and against the lower gate for testing, means for moving said lower gate to permit the discharge of said condenser after testing, a first means located in said chute above said upper gate for holding a column of condensers against movement by gravity, and a second means between said first means and said upper gate to release the lowermost condenser of said column for movement to said lower gate.

7. An apparatus for testing condensers comprising an inclined chute down which the condensers will travel by gravity, means for testing a condenser positioned intermediate the ends of said chute, said means including upper and lower spaced gates alternately movable into and out of the chute, means for moving said upper gate to open position to permit one of said condensers to move by gravity down said chute and against the lower gate for testing, means for moving said lower gate to permit the discharge of said condenser after testing, a first means located in said chute above said upper gate for holding a column of condensers against movement by gravity, and a second means between said first means and said upper gate to release the lowermost condenser of said column for movement to said lower gate, and means mounting said upper and lower spaced gates adjacent to said chute for movement in opposite direction.

8. An apparatus for testing condensers comprising an inclined chute down which the condensers will travel by gravity, means for testing a condenser positioned intermediate the ends of said chute, said means including upper and lower spaced gates alternately movable into and out of the chute, means for moving said upper gate to open position to permit one of said condensers to move by gravity down said chute and against the lower gate for testing, means for moving said lower gate to permit the discharge of said condenser after testing, a first means located in said chute above said upper gate for holding a column of condensers against movement by gravity, and a second means between said first means and said upper gate to release the lowermost condenser of said column for movement to said lower gate, and means pivotally mounting said upper and lower spaced gates adjacent to said chute for rotation in opposite directions.

9. An apparatus for testing condensers comprising an inclined chute down which the condensers will travel by gravity, means for testing a condenser positioned intermediate the ends of said chute, said means including upper and lower spaced gates alternately movable into and out of the chute, means for moving said upper gate to open position to permit one of said condensers to move by gravity down said chute and against the lower gate for testing, means for moving said lower gate to permit the discharge of said condenser after testing, a first means located in said chute above said upper gate for holding a column of condensers against movement by gravity, and a second means between said first means and said upper gate to release the lowermost condenser of said column for movement to said lower gate, and means pivotally mounting said upper and lower spaced gates adjacent to said chute for rotation in opposite directions, and means interconnecting said second means and said upper gate for simultaneous operation thereof.

10. An apparatus for testing condensers comprising an inclined chute down which the condensers will travel by gravity, means for testing a condenser positioned intermediate the ends of said chute, said means including upper and lower spaced gates alternately movable into and out of the chute, means for moving said upper gate to open position to permit one of said condensers to move by gravity down said chute and against the lower gate for testing, means for moving said lower gate to permit the discharge of said condenser after testing, a first means located in said chute above said upper gate for holding a column of condensers against movement by gravity, and a second means between said first means and said upper gate to release the lowermost condenser of said column for movement to said lower gate, said upper and lower gates each including a contact for engaging a different end of a condenser when positioned between said gates, and a test circuit including said contacts.

11. An apparatus for testing condensers comprising an inclined chute down which the condensers will travel by gravity, means for testing a condenser positioned intermediate the ends of said chute, said means including upper and lower spaced gates alternately movable into and out of the chute, means for moving said upper gate to open position to permit one of said condensers to move by gravity down said chute and against the lower gate for testing, means for moving said lower gate to permit the discharge of said condenser after testing, a first means located in said chute above said upper gate for holding a column of condensers against movement by gravity, and a second means between said first means and said upper gate to release the lowermost condenser of said column for movement to said lower gate, said upper and lower gates each including a contact for engaging a different end of a condenser when positioned between said gates, and a test circuit including said contacts, and means responsive to said test circuit for directing said condenser to a predetermined position after testing.

12. An apparatus for testing condensers comprising an inclined chute down which the condensers travel by gravity, a plurality of gates arranged in pairs movable into the chute in the path of movement of the condensers, one pair of said gates operating alternately to hold a series of condensers in end to end relation at the upper portion of the chute and to free the lowermost condenser for passage to a position between a second pair of gates, said second pair of gates having contacts at their extremities for engaging the terminals of the condenser disposed therebetween, a testing means connected to the contacts on the second pair of gates, said testing means including a voltage sensitive relay switch connected to a first gate of said second pair, a current sensitive relay switch connected to the other gate of said second pair, a source of high impedance voltage connected to the first gate of said second pair, so that in contacting the condenser a sufficient dielectric strength will maintain the operating voltage of said voltage sensitive relay switch and sufficient charging current will attain the operating current of said current sensitive relay switch, a movable trough at the discharge end of the chute, means for swinging said trough for directing the condensers into predetermined paths after leaving the testing station, said trough being operable upon operation of both said voltage sensitive relay switch and said current sensitive relay switch.

13. In a device for testing and segregating articles according to their dielectric characteristics, escapement means for holding a stack of said articles in a single file order and for releasing an article biased for movement and disposed at one end of the stack, test circuit means for determining the dielectric characteristics of said articles and including a pair of spaced movable electrical terminal means one of which is movable for engaging an article when released from the stack for electrical connection therewith, said escapement means being connected with one of said electrical terminal means for synchronized movement therewith, and power means for operating said escapement means.

14. The invention set forth in claim 13 including a minimum capacity test circuit means electrically connected to said electrical terminal means so as to test said articles.

15. The invention set forth in claim 13 including separate motor means operable for operating the other one of said pair of movable terminal means.

16. The structure of claim 13 including means controlled by said test circuit means for disposal of the tested article.

17. A device for testing a condenser comprising, a test circuit including in series a pair of spaced electrodes between which said condenser is to be electrically connected, a first resistance element and a source of voltage having high internal impedance, a shunt circuit including a second resistance element connected across said source of voltage, a first relay device including a first switch and means responsive to a voltage drop across said said first resistance element to operate said first relay device to close said switch, a second relay device including a second switch and means responsive to a voltage drop across said second resistance element to operate said second relay device to close said second switch, and means responsive to the closing of said first and second switches together to indicate a test for said condenser.

18. A device for testing a condenser comprising a test circuit including in series a pair of spaced electrodes between which said condenser is to be electrically connected, a first resistance element and a source of voltage having high internal impedance, a shunt circuit including a second resistance element connected across said source of voltage, a first relay device including a first switch and means responsive to a voltage drop across said first resistance element to operate said first relay device to close said switch, a second relay device including a second switch and means responsive to a voltage drop across said second resistance element to operate said second relay device to close said second switch, and circuit means including said first and second switches to indicate a test for said condenser upon closing of said first and second switches together.

19. A device for testing a condenser comprising a test circuit including in series a pair of spaced electrodes between which said condenser is to be electrically connected, a first resistance element and a source of voltage having high internal impedance, a shunt circuit including a second resistance element connected across said source of voltage, a first relay device including a first switch and a first relay control means responsive to a voltage drop across said first resistance element to operate said first relay device to close said switch, a second relay device including a second switch and a second relay control means responsive to a voltage drop across said second resistance element to operate said second relay device to close said second switch, and circuit means including said first and second switches to indicate a test for said condenser upon closing of said first and second switches together.

References Cited in the file of this patent

UNITED STATES PATENTS

| | | |
|---|---|---|
| 2,591,047 | Burge et al. | Apr. 1, 1952 |
| 2,645,341 | Diamond | July 14, 1953 |
| 2,668,618 | Seelhoff | Feb. 9, 1954 |
| 2,725,160 | Ahlstrom | Nov. 29, 1955 |
| 2,762,015 | McGrath | Sept. 4, 1956 |

FOREIGN PATENTS

| | | |
|---|---|---|
| 483,801 | France | May 18, 1917 |